United States Patent [19]

Purcell

[11] 4,056,246

[45] Nov. 1, 1977

[54] FISHING REEL WITH FRICTION DRAG

[75] Inventor: William Purcell, Philadelphia, Pa.

[73] Assignee: Penn Fishing Tackle Mfg. Co., Philadelphia, Pa.

[21] Appl. No.: 750,242

[22] Filed: Dec. 13, 1976

[51] Int. Cl.² .............................................. A01K 89/00
[52] U.S. Cl. .................................................... 242/219
[58] Field of Search ............... 242/219, 211, 212, 213, 242/214, 216, 217, 220, 221

[56] References Cited

U.S. PATENT DOCUMENTS

| 3,104,075 | 9/1963 | Wood | 242/219 X |
| 3,425,644 | 2/1969 | Griste | 242/213 |
| 3,432,114 | 3/1969 | Meisner | 242/219 X |
| 3,478,979 | 11/1969 | Henze | 242/219 X |
| 3,497,155 | 2/1970 | Mimeur | 242/219 X |

Primary Examiner—Edward J. McCarthy
Attorney, Agent, or Firm—Zachary T. Wobensmith, 2nd; Zachary T. Wobensmith, III

[57] ABSTRACT

A fishing reel is disclosed having a spool supported on a shaft between spaced housings. One of the housings has a shaft supporting bearing and a slidably mounted click. The other of the housings which carries the operating handle encloses a pressure plate for adjustable and controlled engagement with a friction drag washer on the spool. A knob for preset adjustment and a brake control lever with limited movement for rapid control of the engagement and disengagement of the pressure plate and drag washer are provided accessible on the other of said housings for free spooling or a braking action on the spool.

9 Claims, 6 Drawing Figures

FISHING REEL WITH FRICTION DRAG

BACKGROUND OF THE INVENTION

1. Field of the Invention

This invention relates to fishing reels and more particularly to fishing reels with controlled friction drag.

2. Description of the Prior Art

It has heretofore been proposed as shown in the U.S. Patent to Griste, U.S. Pat. No. 3,425,644, to provide a fishing reel with a manually operable brake control permitting free spooling and controlled braking. This reel has proven satisfactory but it is considered more desireable from the viewpoint of construction and maintenance to locate the brake contiguous to its controls rather than to shift the spool for brake application.

Summary of the Invention

In accordance with the invention a fishing reel is provided for free spooling or for braking action which includes a knob for preset adjustment of the braking action and a brake control lever with limited movement for rapid control of the engagement and disengagement of a pressure plate with a drag washer carried on the spool, the braking mechanism being located contiguous to the controls and to the actuating handle for the spool.

It is an object of the present invention to provide a fishing reel having a positive but adjustable control of brake application with a predetermined location for free spool action and a predetermined and indicated range for brake control and in which the control structure is readily accessible.

It is a further object of the invention to provide brake mechanism on a fishing reel which is contiguous to the manual controls therefor.

It is a further object of the present invention to provide a fishing reel with a manually accessible brake control lever movable to a positive location for free spooling and in a predetermined range for brake control.

It is a further object of the present invention to provide a fishing reel of the character aforesaid which is rugged and free from operating difficulties.

Other objects and advantages features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings in which a preferred embodiment of the invention is illustrated a reel frame is shown at 10 having side rings 11 and 12 connected by frame posts 13, and with a reel stand 10a carried thereby. The side rings 11 and 12 have integral therewith side housing plates 15 and 16.

Figure 5:
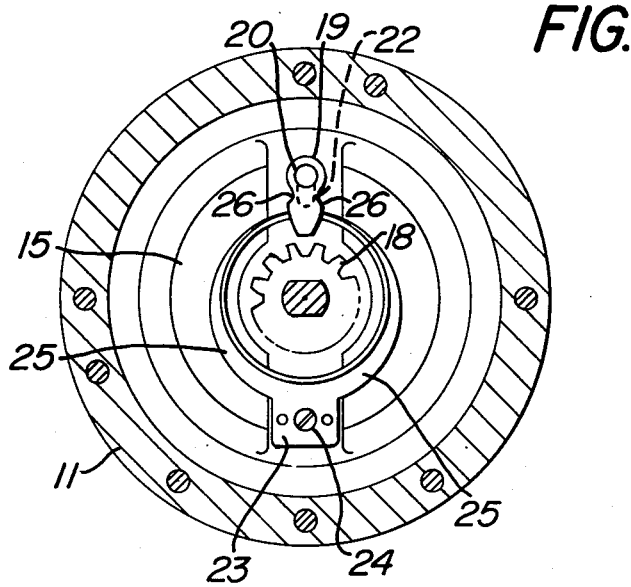
FIG. 5 is a sectional view taken approximately on the line 5—5 of FIG. 2.
Figure 6:
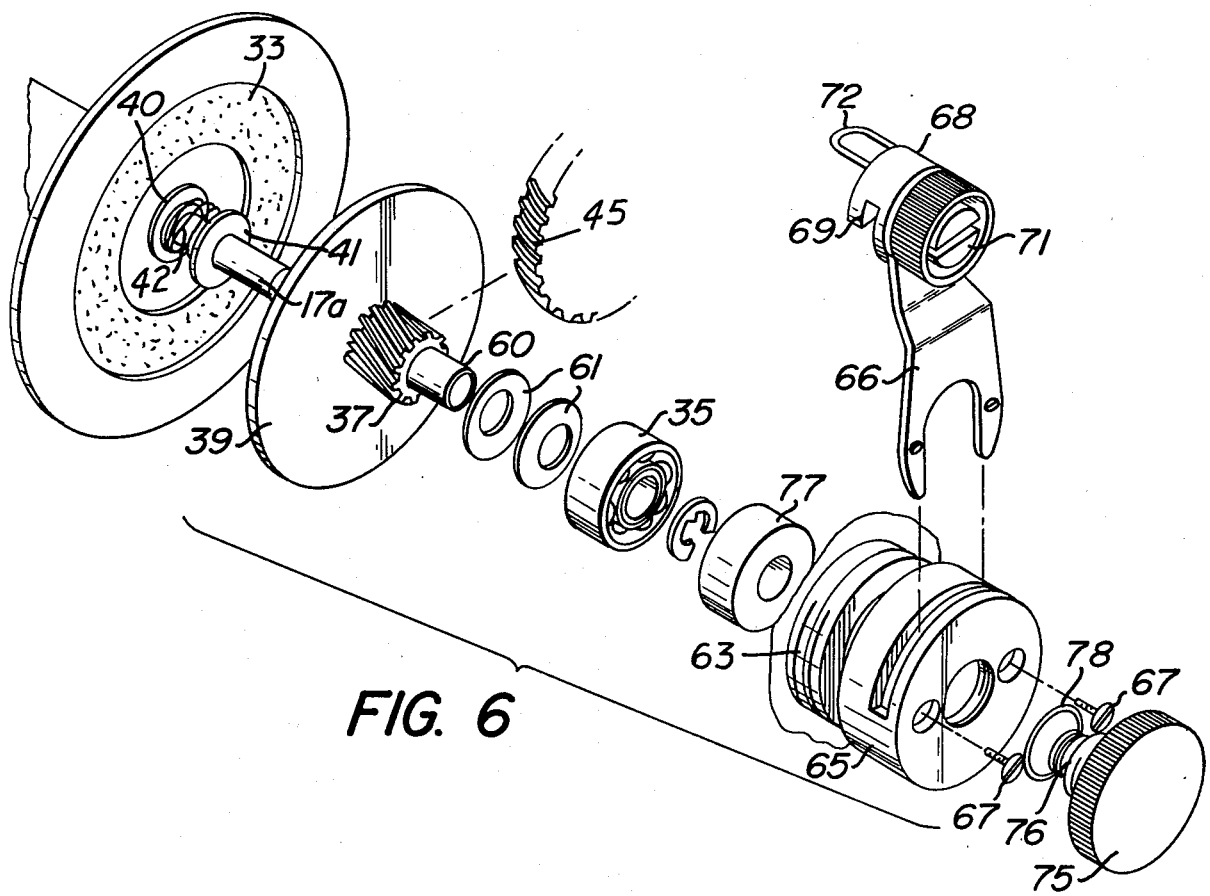
FIG. 6 is an exploded perspective view of a portion of the control structure shown in FIG. 3.

The side housing plate 15 has a bearing 14 carried thereby which supports the spool shaft 17 at one end. The shaft 17 has a click gear 18 carried thereon. A click tongue 19 is provided (see FIGS. 2 and 5) mounted on a click shaft 20 with a click tongue positioning button 21 on the other one of the click shaft 20. The click shaft 20 is slidably carried in an elongated opening 22 in the side housing plate 15. A click spring 23 held in place on the interior of the housing plate 15 by a screw 24 has arcuate arms 25 which engage in opposite recesses 26 on the click tongue when it is in the downward position and permit limited swinging movement of the click tongue 19 in either direction.

Figure 2:
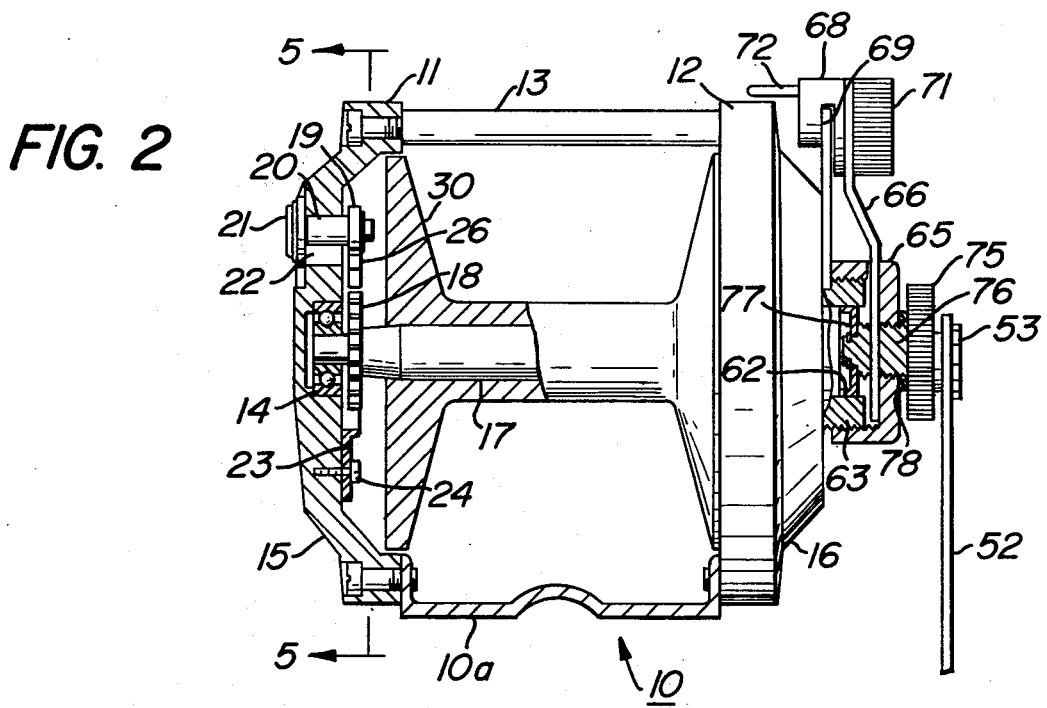
FIG. 2 is a view partly in elevation and partly in vertical section taken approximately on the line 2—2 of FIG. 1.

The ends of the arms 25 engage opposite faces of the click tongue 19 when it is in the upper and out of action position shown in FIG. 2 and prevent movement of the click tongue 19.

The shaft 17 has mounted thereon, between the housing plates 15 and 16, a spool 30 for the reception of the fishing line.

Figure 3:
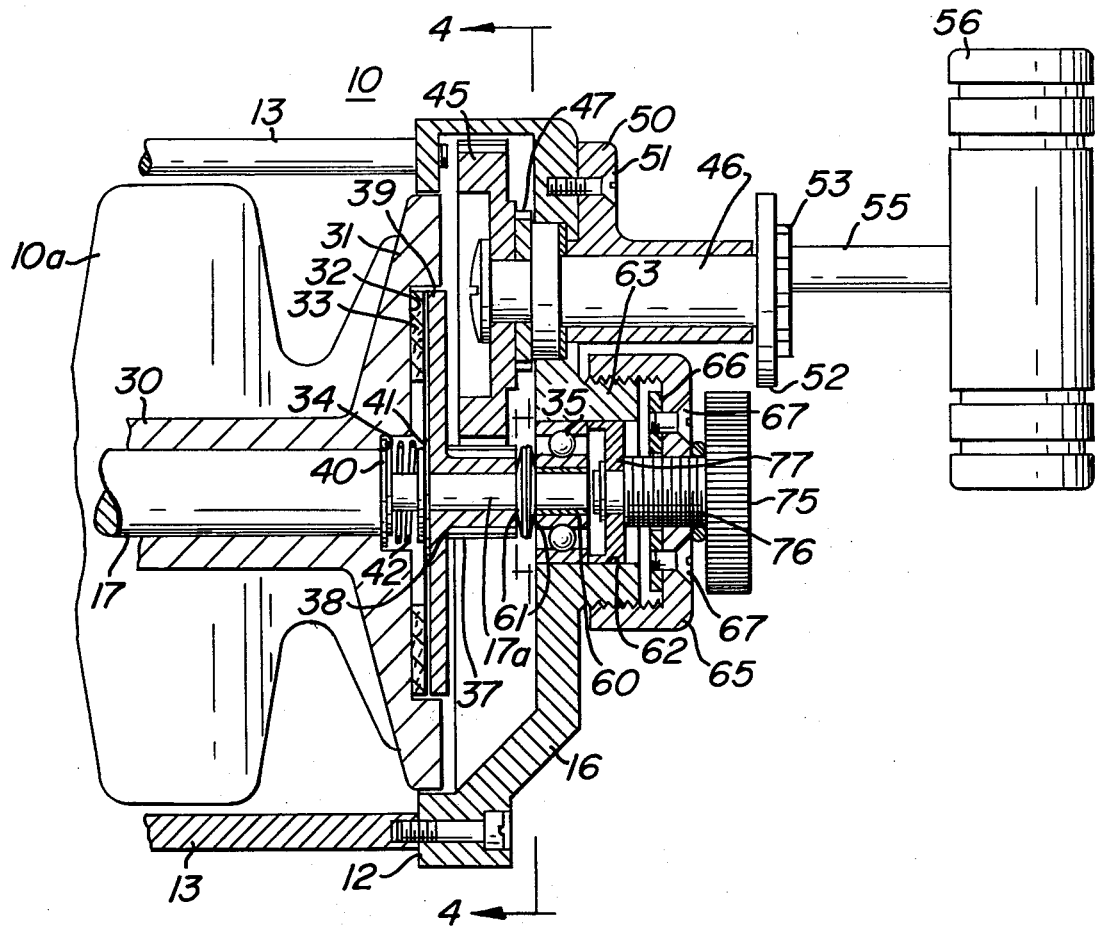
FIG. 3 is a fragmentary sectional view taken approximately on the line 3—3 of FIG. 1.

The spool 30 has an end head 31 with a recess 32 for the reception of a drag washer 33 of friction material carried therein. (See FIG. 3)

The spool 30 also has a central recess 34 through which an extension 17a of the shaft 17 extends. The shaft extension 17a is supported in a bearing 35 mounted in the housing plate 16.

The shaft extension 17a has a gear 37 slidably mounted thereon with a shoulder 38 for the reception of a pressure plate 39.

The pressure plate 39 and gear 37 have a spring guide washer 40 in engagement therewith, with an oppositely facing spring guide washer 41 engaging the shouldered end of the shaft 17. A compression spring 42 carried on the guide washers 40 and 41 normally urges the gear 37 and the pressure plate 39 away from engagement of the plate 39 with the friction drag washer 33.

Figure 4:
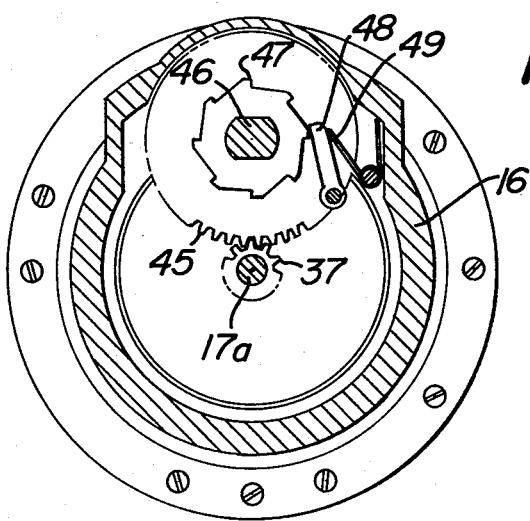
FIG. 4 is a sectional view taken approximately on the line 4—4 of FIG. 3.

The gear 37 has a gear 45 on a shaft 46 in engagement therewith. The shaft 46 carries a ratchet gear 47 and a pivotally mounted ratchet 48 is normally held in engagement therewith by a spring 49 carried on the housing plate 16, thereby to limit movement of the shaft 46 to one direction of rotation. (See FIG. 4)

The shaft 46 is carried in a hub 50 removably mounted on the housing plate 16 by screws 51 and has a radial arm 52 detachably secured to the shaft 46 by a stud 53. The head of the stud 53 can be held by a locking screw 54. (See FIG. 1) The arm 52 carries a crank rod 55 on which a manually operable knob 56 is pivotally supported. (See FIG. 3)

The gear 37 has a sleeve 60 thereon carried on the shaft extension 17a and to which the inner race of the bearing 35 is secured. Conical spring washers 61 are interposed between the end face of the gear 37 and the inner face of the bearing 35. (See FIG. 3)

The outer race of the bearing 35 is in a bore 62 within an externally threaded extension 63 on the housing plate 16. The threaded extension 63 has a nut 65 carried thereon with a drag control lever 66 extending thereinto and secured in place by screws 67. The lever 66 has a guide 68 with a slot 69 for movement along an arcuate guide strip 70 carried on the housing plate 16, one end of the strip 70 being adjacent the hub 50 and the other end being remote therefrom. The guide head 68 can be held onto the lever 66 by a stud 71 and has a position indicating finger 72 (See FIG. 1).

The nut (See FIG. 2) also has in threaded engagement therein the threaded stem 76 of an adjusting knob 75 which stem 76 carries a positioning collar 77 on its inner end, for movement along the bore 62 and for engagement with the outer race of the bearing 35 for presetting the initial longitudinal position of the pressure plate 39 with respect to the drag washer 33. A friction ring 78 of resilient material may be mounted on the stem 76 between the knob 75 and the nut 65.

The mode of operation will now be pointed out.

For free spooling, the control lever 66 is positioned at the free spool position remote from the hub 50. In this position the pressure plate 39 will be urged by the spring 42 out of engagement with the friction drag washer 33. No braking action will be applied under this condition.

Figure 1:
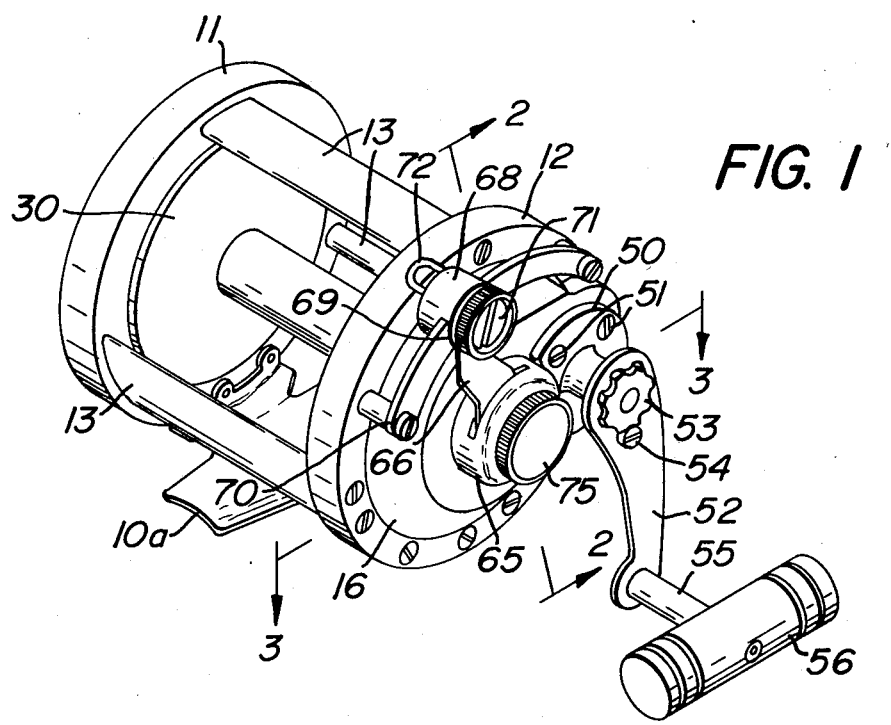
FIG. 1 is a view in perspective of a fishing reel in accordance with the invention.

If now, it is desired to apply a braking action to reduce the payout of line from the spool 30 the guide head 68 is moved clockwise, as seen from the right of FIG. 1, to the desired extent to move the nut 65 and by such movement the threaded stem 76, the positioning collar 77, the bearing 35, and the washers 61 which apply a force against the gear 37 to urge the pressure plate 39 against the friction drag washer 33, the spring 42 being compressed to permit this to occur. The extent of braking will be determined by the positioning of the guide head 68, and if desired, complete locking action can be effected by movement of the guide head 68.

In the brake applied position of the brake control lever 66 the knob 56 can be moved in a clockwise direction as seen in FIG. 1 to wind the line onto the spool 30.

A quick and positive control of the spool operation is thus provided with the spool 30 free and maintained free when the guide head 68 is in the brake release position and with preset and variable brake application controlled by the brake control lever 66 as positioned by movement of the guide head 68.

I claim:

1. A fishing reel having spaced side housing members, a spool interposed between said housing members, a spool shaft journaled at one end in one of said housing members and to which said spool is secured, said spool at its other end being journaled in said other housing member, means for rotating said spool in one direction comprising
   an exteriorly accessible manually operable crank member,
   a gear movable along said spool shaft and driven by said crank member,
   interengageable friction members one of which is on said spool and the other of which is movable with said gear, and
   means for controlling free spool operation of said spool,
   said last mentioned means comprising
   spring means for urging said interengageable members to out of engagement position,
   a brake control lever exteriorly disposed on said other housing member for manual manipulation,
   mounting members for said lever one of which is in threaded engagement with the other for applying a force in opposition to said spring force.

2. A fishing reel as defined in claim 1 in which operating connections are provided between said lever and interengaging members, and said gear provides a portion of said operating connections.

3. A fishing reel as defined in claim 1 in which the other of said interengaging members is carried on said gear.

4. A fishing reel as defined in claim 1 in which a presetting adjusting member is provided for said interengageable members.

5. A fishing reel as defined in claim 1 in which said mounting members include
   a threaded portion carried by said other housing member, and
   a threaded member movable on said threaded portion to advance and retract one of said interengageable members with respect to the other.

6. A fishing reel as defined in claim 1 in which said one of said housing members has click mechanism having a click tongue movable to active and inactive positions.

7. A fishing reel comprising spaced side housing members,
   a spool shaft mounted at its ends in said housing members,
   a spool secured to said shaft for rotation therewith,
   means for rotating said shaft in one direction comprising, at one of said housing members,
   a driving gear contiguous to said one of said housing members,
   manually operable crank means exteriorly accessible at said one of said housing members for driving said driving gear,
   interengageable friction driving members, one of which is carried on said spool and the other of which is carried on said gear, and
   means for controlling the positioning of said interengageable driving members for spool driving from said crank means and for free spool operation,
   said last mentioned means comprising a manually operable lever exteriorly accessible at said one of said housing members, and
   driving connections between said lever and said gear carried friction driving member for controlling the positioning of said gear carried friction driving member with respect to said spool carried friction driving member.

8. A fishing reel as defined in claim 7 in which presetting members are provided in said driving connections for said interengageable members.

9. A fishing reel as defined in claim 7 in which a resilient member is provided for separating said interengageable members.

* * * * *